(12) United States Patent
Jouin

(10) Patent No.: US 6,532,373 B1
(45) Date of Patent: Mar. 11, 2003

(54) MOBILE PHONES PRODUCING AN IMAGE USING IMAGE TEMPLATES

(75) Inventor: Christophe Max Jean Jouin, London (GB)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/433,924

(22) Filed: Nov. 4, 1999

(30) Foreign Application Priority Data

Nov. 6, 1998 (GB) .............................................. 9824253

(51) Int. Cl.⁷ ................................................. G08B 5/22
(52) U.S. Cl. ...................... 455/566; 340/7.51; 340/7.55
(58) Field of Search ................................. 455/566, 550, 455/38.1, 32.4, 140, 526, 817, 525; 340/825.44, 825.47, 825.69, 815.4, 815.53, 7.51, 7.55; 345/122, 133, 115, 116, 193, 194, 621, 634; 379/93.05, 96

(56) References Cited

U.S. PATENT DOCUMENTS

| 5,087,905 | A | * | 2/1992 | Kuramatsu et al. ...... 340/311.1 |
| 5,701,258 | A | * | 12/1997 | Harris et al. ........... 340/825.44 |
| 5,784,001 | A | * | 7/1998 | Deluca et al. ......... 340/825.44 |
| 5,828,313 | A | * | 10/1998 | Mochizuki ............. 340/825.44 |
| 6,020,828 | A | * | 2/2000 | Gotou ................... 340/825.44 |

FOREIGN PATENT DOCUMENTS

| WO | 9611454 | * | 4/1996 | ............ G08B/5/22 |
| WO | 9856197 | * | 12/1998 | ............ H04Q/7/22 |

* cited by examiner

Primary Examiner—Thanh Cong Le
Assistant Examiner—Pablo Tran
(74) Attorney, Agent, or Firm—Sughrue Mion, PLLC

(57) ABSTRACT

A mobile phone is disclosed which produces an image using image templates. An image display provided in a mobile phone compiles a repertory of image templates, which is stored in memory based on indicated order and coefficients, generates an image profile of selected image, and provides the selected image on the image display.

15 Claims, 2 Drawing Sheets

MOBILE PHONES PRODUCING AN IMAGE USING IMAGE TEMPLATES

BACKGROUND OF THE INVENTION

1. Field of the Invention

This invention relates to mobile phones, and more particularly to mobile phones with means for display of selected images.

2. Description of the Related Art

Transmission of a still or fixed image normally requires a relatively large bandwidth. The use of a visual calling person display is disclosed in U.S. Pat. No. 5,761,279 to Bierman et all., however, for which only a small amount of data need be transmitted to achieve a selected facial image. The Bierman patent makes use of data compression techniques to provide a centralised store of facial images retrievable on the basis of a calling party's number.

Researchers at the University of Kent in Canterbury have reported development of a method of storage for facial images using a series of templates. The stored facial image may be recreated by means of an ordered compilation of the templates.

The capacity of memories available as components for telephone use continually increases and is accompanied by price reductions. The current trend is for memory to double in capacity over a three year period whilst a constant price is maintained. The transmission of data over the air interface is still restricted (e.g. to 9.6 Kbits per second for GSM) and the costs associated with data transmission are not expected to be reduced significantly.

The availability of higher capacity memory for use in mobile phones allows novel and more flexible use of data and in particular maximum use of data transmitted over-the-air.

SUMMARY OF THE INVENTION

It is an object of the present invention to provide means for simple provision of a variety of useful images at the user interface of a mobile phone.

It is another object of the invention to provide selected images on the display of a mobile phone by means of data transmitted over the air interface in small amounts and at relatively low data rates.

According to the present invention, there is provided a mobile telephone programmed to operate under the control of a CPU, and comprises an image display, a repertory of image templates stored in memory, and a processor for compiling said each image templates based on indicated order and coefficients to generate an image profile of selected image and for providing said selected image on said image display.

The above and other objects, features and advantages of the present invention will become apparent from the following description with reference to the accompanying drawings which illustrate examples of the present invention.

DETAILED DESCRIPTION OF THE PREFERRED EMBODIMENTS

Figure 1:
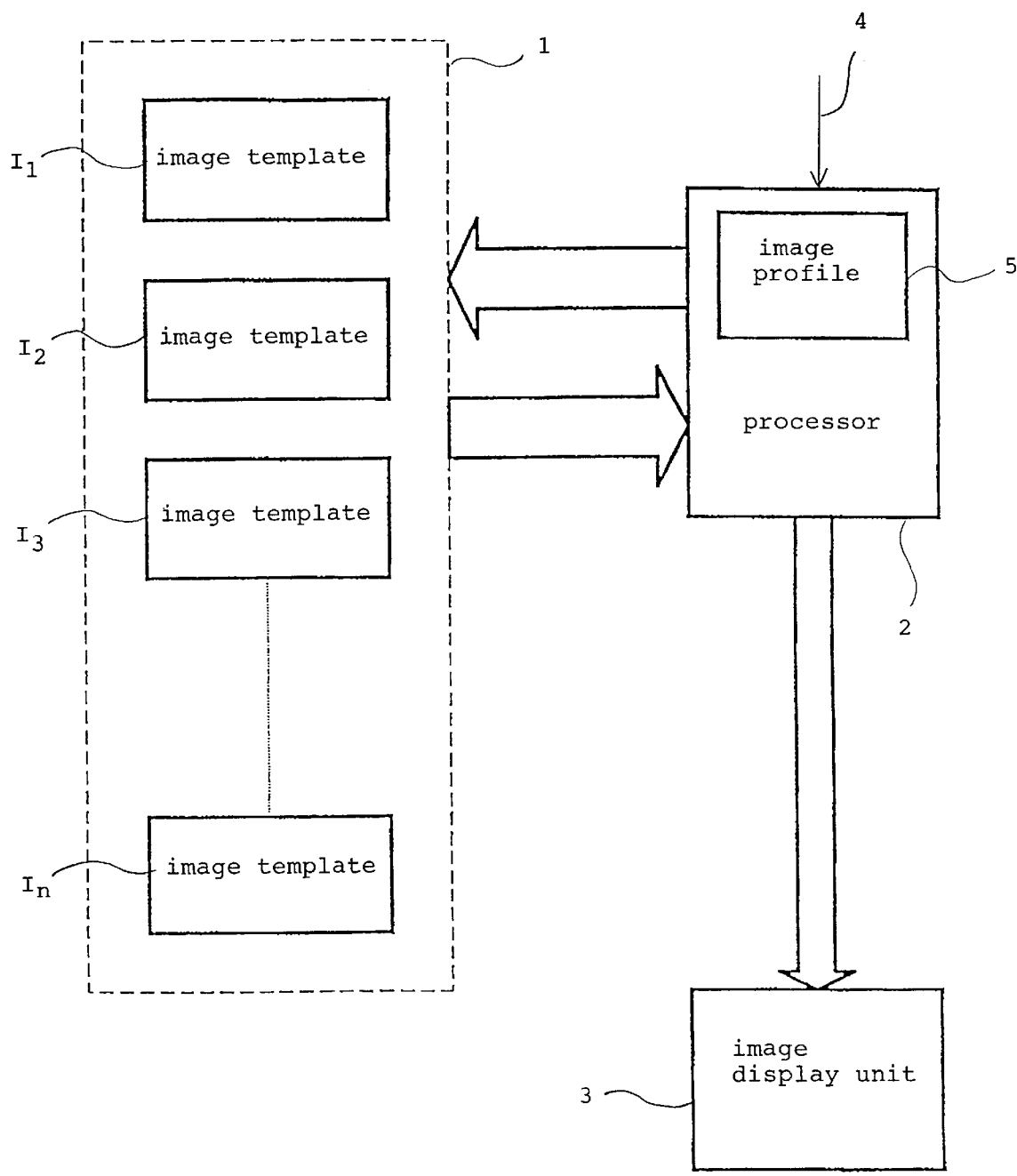
FIG. 1 is a functional block diagram of an image transfer device.

Referring now to FIG. 1, a mobile telephone according to an embodiment of the present invention comprises a memory 1, processor 2 and an image display unit 3. The memory 1 has a series of image templates stored and these image templates are represented in FIG. 1 as $I_1, I_2, I_3, \ldots, I_n$. An image control signal 4 is input to processor 2.

The image control signal 4 ($I_{control}$), where $$I_{control} = I_1, I_2C_2, I_3C_3, \ldots, I_nC_n,$$

has a series of template identifiers and contains also a series of coefficients, $C_2, C_3, \ldots, C_n$ with at least one coefficient for each of the templates other than the first template $I_1$.

On receipt of the image control signal 4, template $I_1$ is selected by the processor 2 and template $I_2$ is then added to or subtracted from template $I_1$ to form an image profile 5 in processor 2. Image profile 5 differs from both image template $I_1$ and image template $I_2$. Addition of $I_2$ to $I_1$ or subtraction of $I_2$ from $I_1$ is determined by the coefficient $C_2$ contained in the control signal 4 for template $I_2$. The next image template $I_3$ is then selected and is added to or subtracted from image profile 5 in accordance with the coefficient $C_3$ for image template $I_3$ contained in the image control signal 4.

Each image template $I_2, I_3, \ldots, I_n$ within the repertory of image templates is selected in sequence gradually to modify, by an ordered compilation of image templates, image profile 5. Each successive image template is added to, subtracted from or ignored by image profile 5 in accordance with its coefficient as contained within the image control signal 4. The resultant image profile 5 is then displayed on image display unit 3.

In this embodiment, the first image template $I_1$ is a general representation of a human face. Addition of image template $I_2$ to image template $I_1$ will modify the general human face of image template 1 to make the image appear more masculine. Subtraction of image template $I_2$ from image template $I_1$ will provide an image which appears to be a more feminine image.

Successive image templates $I_1, I_2, \ldots, I_n$ are included in the image profile 5, or ignored, in accordance with the coefficients assigned to each image template by the image control signal 4. In this manner closer and closer approximations to the required image are achieved. An image control signal 4 of approximately 50 bytes can therefore trigger the generation of an image clearly recognizable on image display unit 3 as a particular human face. One such image may be the facial image of the person making the call to a mobile phone.

The image control signal 4 may be supplied from a number of sources and may be conveniently a signal or sequence of signals received by the telephone across the air interface.

The caller will need to have saved in memory and to transmit, the image control signal 4 descriptive of the required image. In order to transmit his own facial image for example, the caller need not have the image display facility within his own phone but need have stored only the control signal descriptive of his own image.

A set of image templates capable of providing, through ordered compositions, the required images may be entered into the memory of the mobile phone by various means. It is anticipated that a set of image templates for facial images and the personal control signal for the purchaser might best be entered into the phone at the point of sale. The generation of the purchaser's "identikit" image and its descriptive control signal would require a specially adapted computer and some skill from the operator of the computer.

In a further example of the use of a set of image templates to provide images, at least part of the repertory of image templates stored in memory is compiled from signals received by the telephone over its air interface.

For many information displays, the larger part of the display is taken up with items of information which do not change or change infrequently. Displays of stock market prices or football scores for example have the larger part of the display space taken up with the names of the companies or teams to which the prices or scores relate. In order to compile useful displays of mixed current and previously recorded information, some current information must be entered into the image profile.

Conveniently a set of image templates would comprise image templates containing both unchanging information for ready display and current information subject to revision. The "current" templates can then be written to with the current information regarding price or score. A combination of the unchanging information and the current information will provide the required display with only a small amount of data transmitted over the air interface at relatively low data rates.

Figure 2:
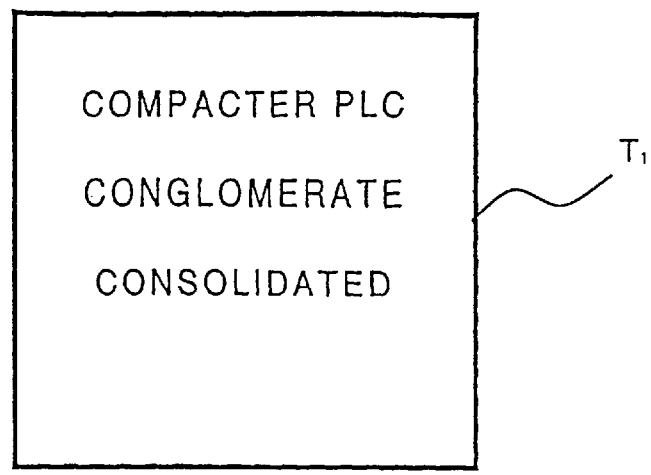
FIG. 2 is a simplified decomposition of a display into templates.
Figure 2:
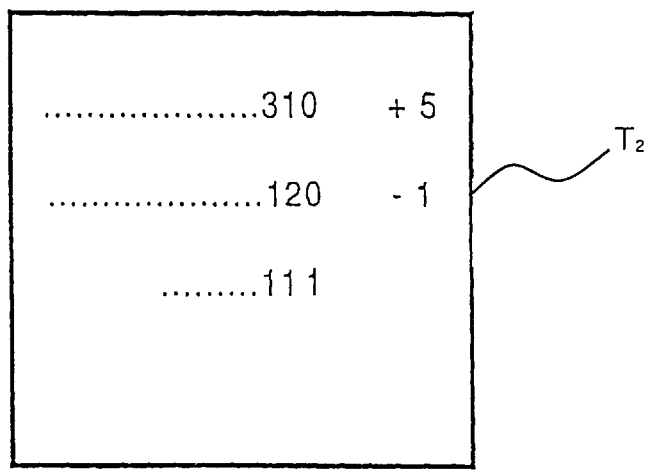
Figure 2:
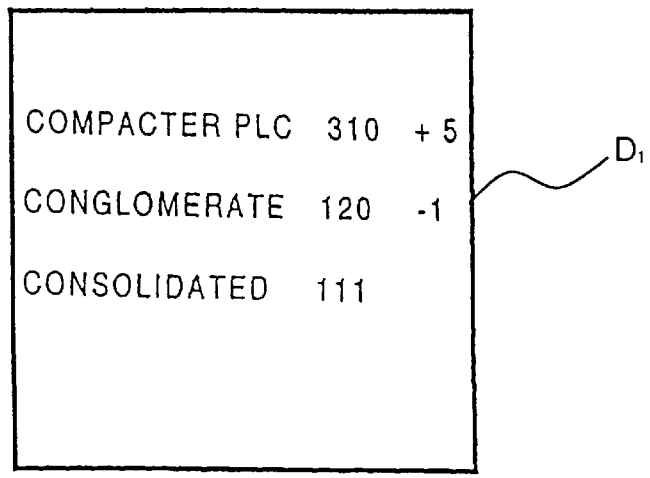

Referring to FIG. 2, the template $T_1$ shows three imaginary company names which represent the display information unlikely to change. The prices corresponding to the three companies of template $T_1$ are shown in template $T_2$ as current prices and the price change, plus or minus, during the day. Of the six numbers in template $T_2$ four have been changed to provide the latest prices viz. 310,+5, 120 and –1. A "0" representing no change in the price, such as alongside 111, would not be displayed.

Although the information stored in the templates, or transmitted, may be text or numerals, all displays and corresponding templates are referred to herein as images. The image control signal for the composition of the display $D_1$ for the simplified example of FIG. 2 would be $$I_{control} = T_1 + T_2 .$$

For templates subject to updating with changes it will be necessary to provide an indication of the time at which the information was amended. The time and nature of the last amendment may be the subject of a separate template so that the times of transmission of the last amendment and the next amendment due for transmission can be included.

Constraints on the size or construction of the image display may allow only a limited number of features to be presented simultaneously on the image display. The information may then be presented in sequence such that the image control signal 4 would be $$I_{control} = t_1 (T_1 + T_2), t_2 T_{update}, t_1 (T_{n-2} + T_{n-1} - T_n),$$

where $t_1$ and $t_2$ are the times for which the particular display composition is presented and $T_{n-2} + T_{n-1} - T_n$ is a composition from a set of templates other than $T_1$ and $T_2$.

While a preferred embodiment of the present invention has been described using specific terms, such description is for illustrative purposes only, and it is to be understood that changes and variations may be made without departing from the spirit or scope of the following claims.

What is claimed is:

1. A mobile telephone programmed to operate under the control of a CPU, comprising:

an image display;

a repertory of image templates stored in memory; and a processor for compiling said each image templates based on indicated order and coefficients to generate an image profile of selected image and for providing said selected image on said image display.

2. A mobile telephone according to claim 1, wherein said processor compiles image templates in accordance with a signal or sequence of signals received by the telephone across an air interface.

3. A mobile telephone according to claim 1, wherein said processor compiles image templates in accordance with a signal or sequence of signals generated within said mobile telephone.

4. A mobile telephone according to claim 1, wherein said selected image on the image display is a fixed image.

5. A mobile telephone according to claim 4, wherein said selected image on the image display is a facial image.

6. A mobile telephone according to claim 5, wherein said facial image is that of the current caller to said mobile telephone.

7. A mobile telephone according to claim 2, wherein said selected image on the image display is a fixed image.

8. A mobile telephone according to claim 7, wherein said selected image on the image display is a facial image.

9. A mobile telephone according to claim 8, wherein said facial image is that of the current caller to said mobile telephone.

10. A mobile telephone according to claim 3, wherein said selected image on the image display is a fixed image.

11. A mobile telephone according to claim 10, wherein said selected image on the image display is a facial image.

12. A mobile telephone according to claim 11, wherein said facial image is that of the current caller to said mobile telephone.

13. A mobile telephone according to claim 1, wherein at least part of the repertory of image templates stored in memory is compiled from signals received by the telephone over its air interface.

14. A mobile telephone according to claim 2, wherein at least part of the repertory of image templates stored in memory is compiled from signals received by the telephone over its air interface.

15. A mobile telephone according to claim 3, wherein at least part of the repertory of image templates stored in memory is compiled from signals received by the telephone over its air interface.

* * * * *